(No Model.)
C. BENESH.
REEL FOR HARVESTERS AND BINDERS.
No. 556,244. Patented Mar. 10, 1896.
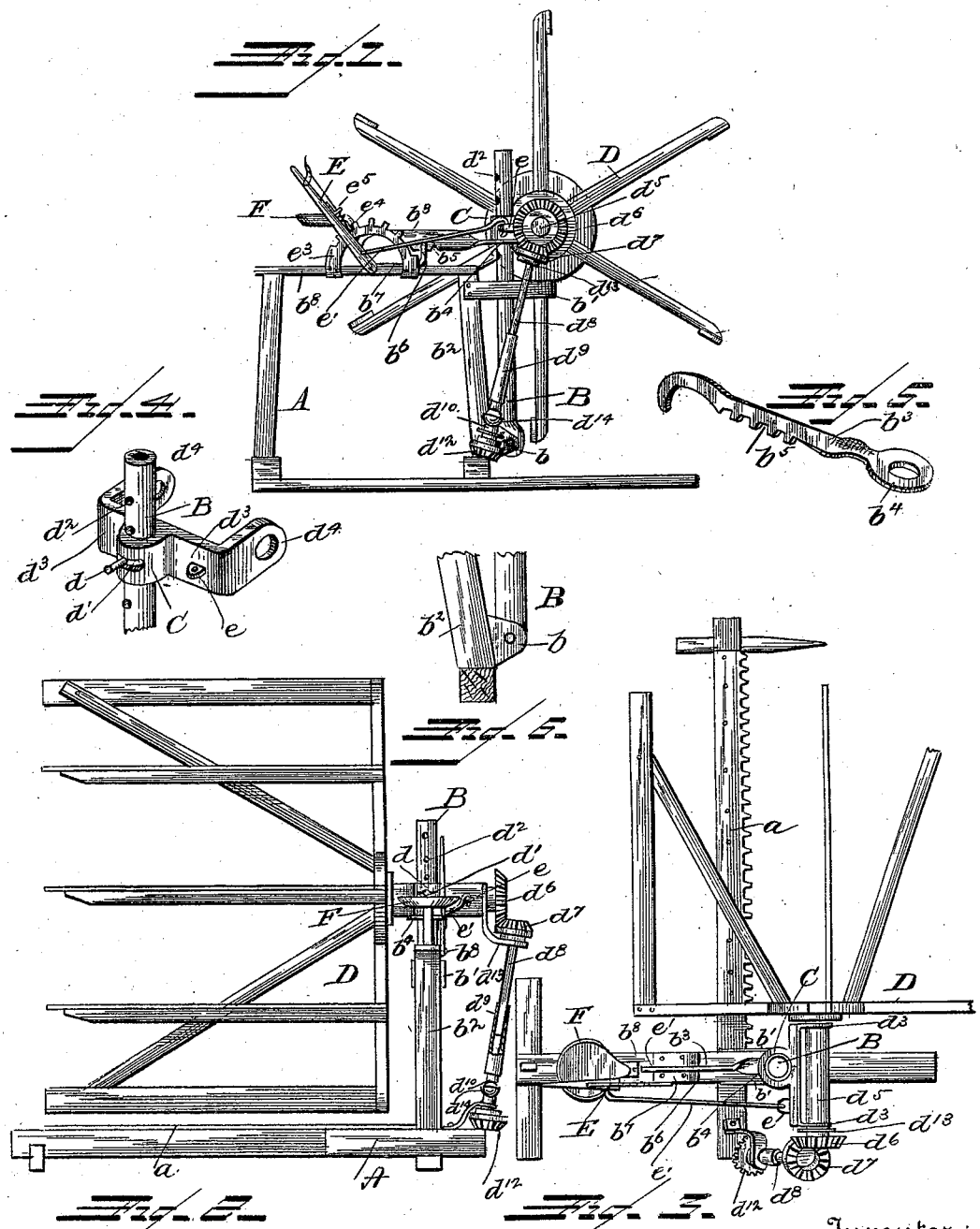
Witnesses
F. L. Ourand
J. T. Graham
Inventor:
Charles Benesh
by J. Fred. Keily
his Attorney.

UNITED STATES PATENT OFFICE.

CHARLES BENESH, OF WAHPETON, NORTH DAKOTA.

REEL FOR HARVESTERS AND BINDERS.

SPECIFICATION forming part of Letters Patent No. 556,244, dated March 10, 1896.

Application filed April 23, 1895. Serial No. 546,900. (No model.)

*To all whom it may concern:*

Be it known that I, CHARLES BENESH, a citizen of the United States, residing at Wahpeton, in the county of Richland and State of North Dakota, have invented certain new and useful Improvements in Reels for Harvesters and Binders; and I do hereby declare the following to be a full, clear, and exact description of the invention, such as will enable others skilled in the art to which it appertains to make and use the same.

This invention contemplates certain new and useful improvements in reels designed to be used in connection with harvesters and binders.

The object of the invention is to provide a reel which will be simple in construction and which will be capable of adjustment to different angles with relation to the cutter-bars of a harvester, whereby the standing grain may be directed against the cutter-bars when the wind is blowing from an angle thereto.

A further object is to provide means whereby the reel may also be adjusted vertically and longitudinally in the main frame of a harvester.

These objects are accomplished by pivoting a vertical supporting-bar at its lower end to the main frame of a harvester and mounting the shaft of a reel in bearings which are supported by a sleeve revoluble on said pivoted bar, said sleeve being also capable of vertical adjustment on said pivoted bar.

The invention comprises the details of construction and also the combination and arrangement of parts, substantially as hereinafter fully set forth, and particularly pointed out in the claims.

In the accompanying drawings, Figure 1 is a view in side elevation illustrating my improved reel. Fig. 2 is a rear view. Fig. 3 is a top plan view. Figs. 4, 5, and 6 are detail views.

Referring to the drawings, A designates the main frame of a harvester, which is supported in the usual manner and provided with a cutter-bar $a$ of any preferred construction.

B is a rocking arm or bar pivoted at its lower end in bearings $b$ secured to frame A adjacent the inner end of the cutter-bar, the outward movement of said arm or bar being limited by a bracket or loop $b'$ secured to an upright $b^2$ of frame A. The pivotal adjustment of rocking bar B is controlled by an arm or lever $b^3$ having an eye or loop $b^4$, through which said rocking bar is passed, said arm or lever being provided with teeth $b^5$ on its under side, which are designed to engage a struck-up portion $b^6$ of a plate or bracket $b^7$ secured on a bar $b^8$ of frame A. The adjustment of the rocking bar is accomplished by causing the teeth of arm or lever $b^3$ to engage with the struck-up portion of plate or bracket $b^7$.

C is a sleeve which is adapted to turn on the rocking bar B, and the same is vertically adjustable thereon by means of a pin $d$ passed through a slot $d'$ of said sleeve and secured in one of the series of holes or openings $d^2$ in said rocking bar. The slot $d'$ permits the turning of the sleeve on said bar without interference from said pin. Wings $d^3$ are formed integral with said sleeve C, and to these wings are secured bearings $d^4$ for the shaft $d^5$ of a reel D, which latter is of any preferred construction. On the outer end of shaft $d^5$ is keyed a beveled pinion $d^6$, with which is designed to mesh a similar pinion, $d^7$, of a shaft $d^8$. At its lower end this shaft fits in a sleeve $d^9$ secured fast to the upper end of a second shaft, $d^{10}$, said latter shaft having a pinion $d^{12}$ on its lower end, which is operated by any suitable gearing connected with the power driving mechanism of the harvester. By means of this gearing the reel D is caused to revolve when the harvester is in operation, the shaft $d^8$ being moved up or down in the sleeve $d^9$ in a manner corresponding to the adjustment of the reel, said movement being accomplished by an arm or bearing $d^{13}$ secured to shafts $d^5$ and $d^8$.

The shaft $d^{10}$ is provided with a universal joint $d^{14}$ in order to permit of the adjustments of the reel without disengaging or cramping gear $d^{12}$ in its engagement with the driving-gear with which it meshes.

An ear or lug $e$ projects from the outer wing $d^3$ of sleeve C, and to this ear or lug is connected one end of a pitman $e'$, which is connected at its other end to an adjusting-lever E pivoted on bar $b^8$. A semicircular bracket $e^2$ provided with teeth $e^3$ on its upper edge is mounted adjacent lever E, said teeth being engaged by a pawl $e^4$ of a locking-lever $e^5$ mounted on said lever E, whereby said adjusting-lever may be secured and held locked at various angles. A seat F is mounted in any suitable position on frame A.

By means of lever E the reel C can be adjusted at an angle to the cutter-bar of the harvester, so that when a strong wind is blowing at an angle to said cutter-bar the reel will be set at a corresponding angle, whereby the grain is directed toward said cutter-bar.

The advantages of my invention are apparent to those skilled in the art to which it appertains, and it will be understood from what has been said that by means of the combined vertical, longitudinal, and pivotal horizontal adjustment, such as herein employed a great increase in the efficiency of the reel is obtained.

The invention is also simple in construction, and comprising but few parts is not liable to readily get out of order or be deranged.

I claim as my invention—

1. The herein-described improvement in harvesters, comprising a main frame, a bar pivoted at its lower end in said frame and having a series of holes or openings therein, means for controlling the pivotal adjustment of said bar, a sleeve mounted on said bar, a pin inserted in one of said holes or openings and projected through a slot in said sleeve, a reel mounted in bearings supported by said sleeve, and means for adjusting said reel at an angle to the vertical plane of the cutting apparatus, substantially as set forth.

2. The herein-described improvement in harvesters, comprising a main frame, a bar pivoted at its lower end in said frame and provided with a series of holes or openings therein, means for controlling the pivotal adjustment of said bar, a sleeve mounted on said bar and having a slot therein, a pin inserted in one of the holes or openings of said bar and projected through said slot, a reel mounted in bearings supported by said sleeve, and means for adjusting said reel at an angle to the vertical plane of the cutting apparatus, substantially as set forth.

3. The herein-described improvement in harvesters, comprising a main frame, a bar pivoted at its lower end in said frame and having a series of holes or openings therein, an arm or lever for controlling the pivotal adjustment of said bar and provided with teeth on its under side, a plate or bracket adapted to engage said teeth, a sleeve mounted on said bar and having a slot therein, a pin inserted in one of said holes or openings and projected through said slot, a reel carried by said sleeve, and means for adjusting said reel at an angle to the vertical plane of the cutting apparatus, substantially as set forth.

4. The herein-described improvement in harvesters, comprising a main frame, a bar pivoted at its lower end in said frame and having a series of holes or openings therein, an arm or lever for controlling the pivotal adjustment of said bar, a sleeve mounted on said bar and having a slot therein, a pin inserted in one of the holes or openings of said bar and projected through said slot, a reel mounted in bearings supported by said sleeve, and a lever for adjusting said reel at an angle to the vertical plane of the cutting apparatus, substantially as set forth.

5. The herein-described improvement in harvesters, comprising a main frame, a bar pivoted at its lower end in said frame and provided with a series of holes or openings, an arm or lever for controlling the pivotal adjustment of said bar, a sleeve mounted on said bar and having a slot therein, and wings projecting therefrom, a pin in one of said holes or openings and projected through said slot, a reel mounted in bearings supported by said wings, a lever mounted in said frame, and a pitman connecting said lever and one of the wings of said sleeve, whereby said reel may be adjusted at an angle to the vertical plane of the cutting apparatus, substantially as set forth.

6. The herein-described improvement in harvesters, comprising a main frame, a bar pivoted at its lower end in said frame and having a series of holes or openings therein, an arm or lever for controlling the pivotal adjustment of said bar, a sleeve mounted on said bar, said sleeve being provided with a slot and having wings projecting therefrom, a pin inserted in one of the holes or openings of said bar and projecting through said slot, a lug or ear projecting from one of said wings, a reel mounted in bearings supported by said wings, a lever mounted in said frame, a pitman connecting said lever and said lug or ear, whereby said reel may be adjusted at an angle to the vertical plane of the cutting apparatus, and means for locking said latter lever in position, substantially as set forth.

In testimony whereof I affix my signature in presence of two witnesses.

CHARLES BENESH.

Witnesses:
WM. H. FERGUSON,
JOHN M. CULVER.